(12) United States Patent
Sarawat et al.

(10) Patent No.: US 8,850,523 B2
(45) Date of Patent: Sep. 30, 2014

(54) WATERMARKS FOR ROAMING

(75) Inventors: Vikas Sarawat, Broomfield, CO (US);
Bernard McKibben, Broomfield, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 27 days.

(21) Appl. No.: 13/446,125

(22) Filed: Apr. 13, 2012

(65) Prior Publication Data
US 2013/0276062 A1 Oct. 17, 2013

(51) Int. Cl.
*G06F 7/04* (2006.01)
*G06F 17/30* (2006.01)

(52) U.S. Cl.
USPC .............................. 726/3; 709/223; 455/411

(58) Field of Classification Search
CPC ..... H04W 12/06; H04W 12/08; H04W 12/12; G06F 21/16; H04L 41/00
See application file for complete search history.

(56) References Cited

U.S. PATENT DOCUMENTS

| 8,260,290 B2* | 9/2012 | Pressley et al. | 455/433 |
| 8,312,552 B1* | 11/2012 | Hadden et al. | 726/26 |
| 8,589,689 B2* | 11/2013 | Palanigounder et al. | 713/171 |
| 2009/0061859 A1* | 3/2009 | Bengtsson | 455/433 |
| 2011/0119492 A1* | 5/2011 | Palanigounder et al. | 713/171 |
| 2011/0171954 A1* | 7/2011 | Bengtsson | 455/432.1 |
| 2012/0034909 A1* | 2/2012 | Hwang et al. | 455/414.1 |
| 2012/0185578 A1* | 7/2012 | Perkuhn et al. | 709/223 |

* cited by examiner

*Primary Examiner* — Fikremariam A Yalew
(74) *Attorney, Agent, or Firm* — Great Lakes Intellectual Property, PLLC.

(57) ABSTRACT

A watermarking process is contemplated to facilitate branding and other message communication operations, such as to facilitate notifying a user associated with a home service provider of a watermark or communicating advertisements and/or personal messages to the user while accessing services through a visited service provider. The contemplated watermarking process may be particularly beneficial with devices having capabilities to roam between multiple service providers.

19 Claims, 3 Drawing Sheets

Fig. 2

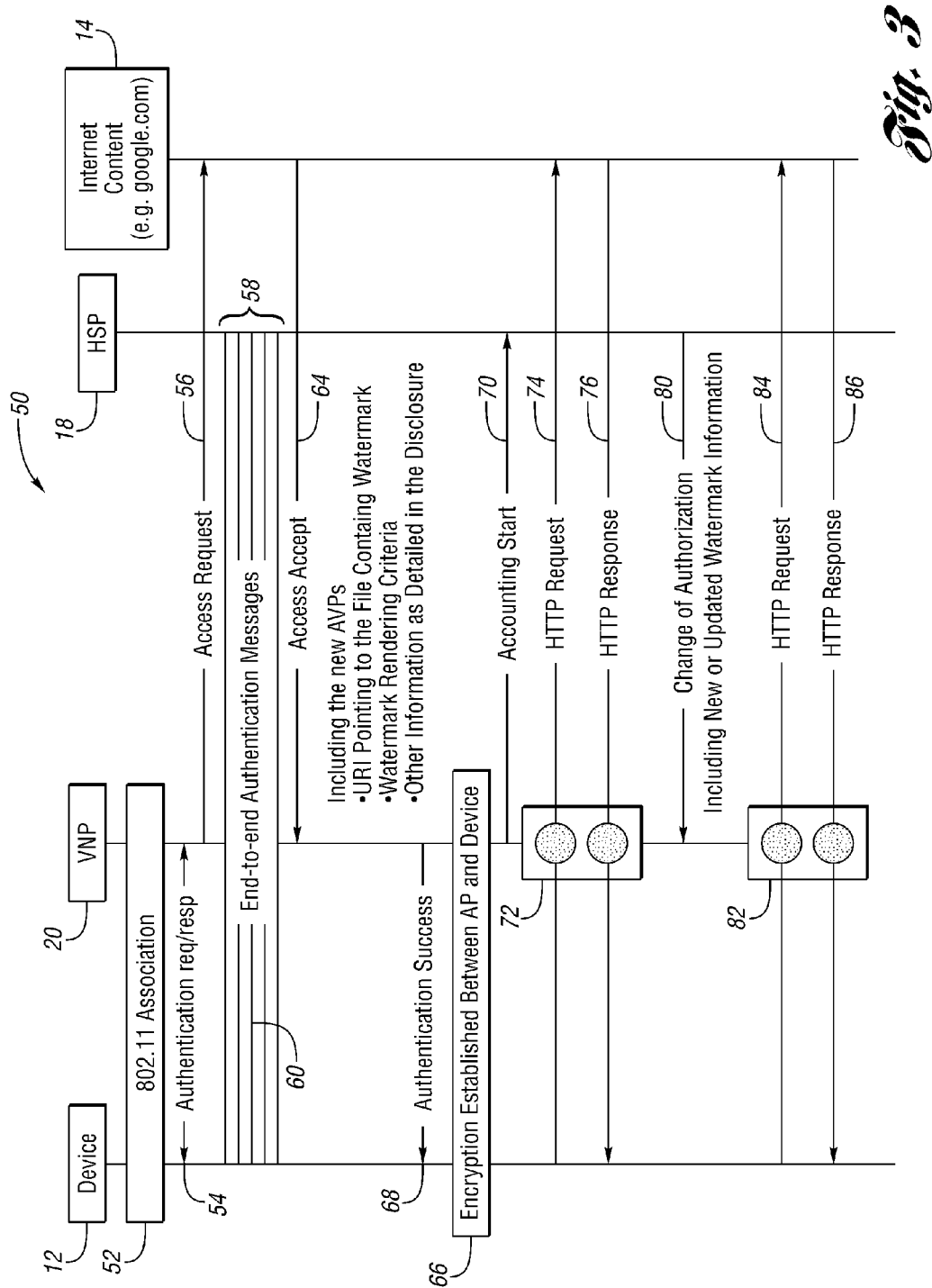

WATERMARKS FOR ROAMING

TECHNICAL FIELD

The present invention relates to providing brand awareness when a subscriber accesses services using facilities of a service provider other than their home or primary service provider, such as but not necessary limited to facilitating brand awareness during Wi-Fi roaming.

BACKGROUND

Wi-Fi roaming generally relates to the capability of facilitating access to Wi-Fi services of different Internet service providers (ISPs). The Wi-Fi roaming may include a mobile device, such as but not limited to a computer, tablet, personal digital assistant (PDA), a phone, etc., relying upon Wi-Fi facilities of a visited ISP while temporarily away from their home ISP. The visited and home ISPs may have an arrangement or other cooperative understanding to permit their subscribers access to each other's Wi-Fi facilities so that their subscribers can roam between the home and visited ISPs facilities without concern. U.S. patent application Ser. No. 13/423,359, entitled Multiple Access Point Zero Sign-on, the disclosure of which is hereby incorporated by reference in its entirety, relates to facilitating Wi-Fi roaming and other operations where the subscriber of one ISP or other service provider (SP) or multiple service provider (MSO) is able to access services while connected through facilities of another ISP, SP, or MSO.

A home ISP may wish to provide brand awareness to their subscribers when the subscribers are relying on Wi-Fi facilities of another, visited ISP. The brand awareness may relate to displaying a logo of the home ISP to reinforce association with their services, to provide targeted advertising, and to provide other messages or indicia to their subscriber (e.g., email, text messages, etc.), which are collectively referred to herein as a watermark. It may be desirable to prevent the visited ISP from identifying the subscriber or otherwise being exposed to personal information of the subscriber. It may also be desirable to tailor the watermark to the identity of subscriber or the subscriber's personal information. Accordingly, a need exists to facilitate watermarks for roaming, and in particular, to facilitating use of watermarks without undue exposure of subscriber personal information to the visited ISP, SP, or MSO.

BRIEF DESCRIPTION OF THE DRAWINGS

FIG. 2 illustrates a watermark as contemplated by one non-limiting aspect of the present invention.

FIG. 3 illustrates a sequencing diagram of a method for watermarking as contemplated by one non-limiting aspect of the present invention.

DETAILED DESCRIPTION

Figure 1:
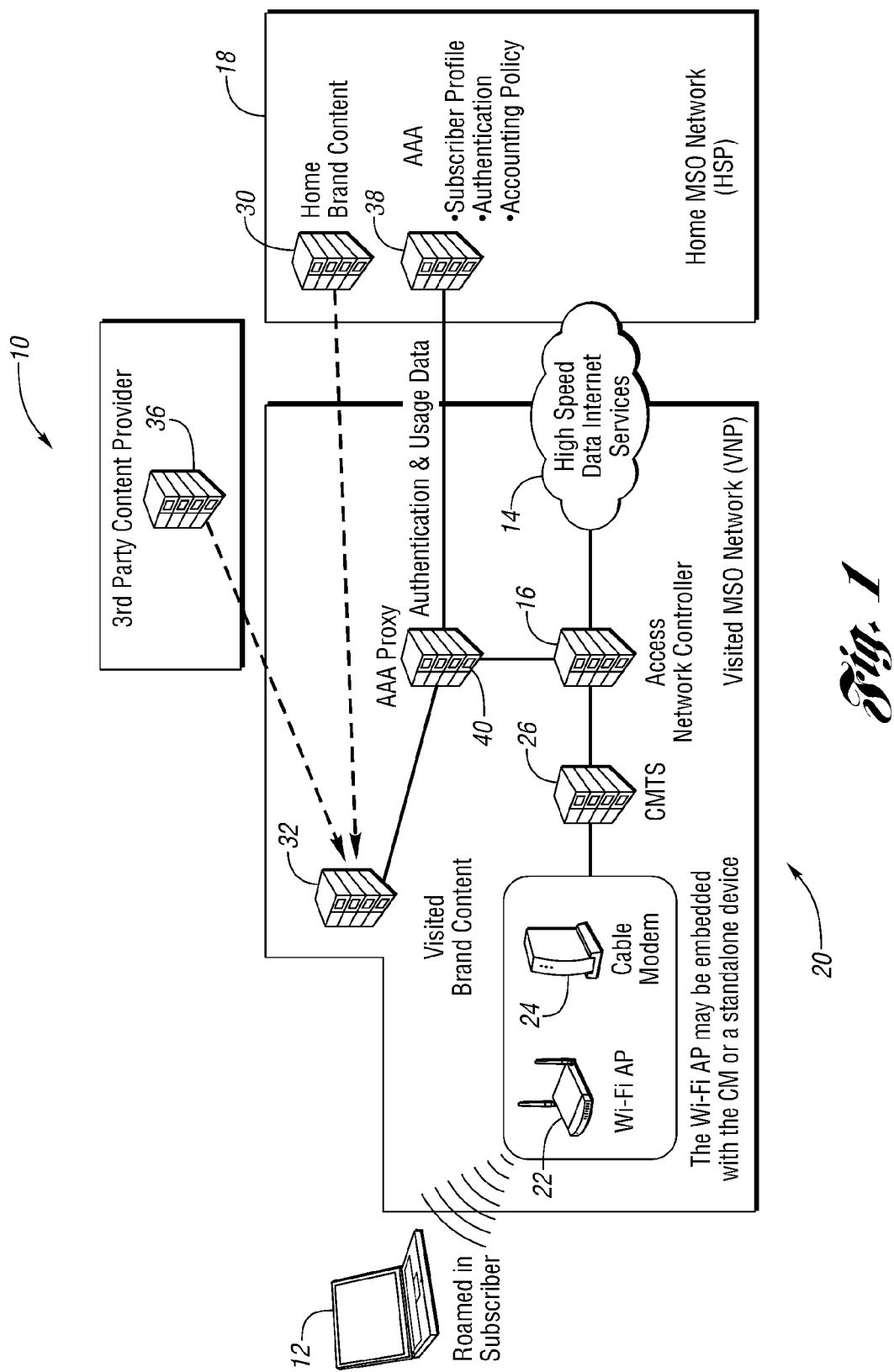
FIG. 1 illustrates a watermarking system as contemplated by one non-limiting aspect of the present invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 1 illustrates a watermarking system 10 as contemplated by one non-limiting aspect of the present invention. The system 10 is predominately described with respect to directing signaling between a device 12 and the Internet 14 by way of an Internet gateway controller 16 or access network controller. This configuration may be associated with an Internet service provider (ISP) or other entity, such as but not limited to a multiple system operator (MSO) or other service provider (SP) tasked with providing services to one or more user devices 12. The system 10 is contemplated to facilitate access to services when the device 12 travels from a home MSO network (HSP) 18 to a visited MSO network (VNP) 20. The present invention contemplates the HSP 18 and the VNP 20 being similarly configured and distinguishing between the HSP 18 and the VNP 20 depending on whether a user of the device 12 is a subscriber to the HSP 18 or the VNP 20. The status of being a subscriber may be determined in the event the user has a contractual commitment with the HSP 18 and not the VNP 20 or the user is otherwise associated with the HSP 18 such that personal information or financial commitments made by the user to the HSP 18 are not shared with the VNP 20. Optionally, the HSP 18 may be associated with a certain brand of service provider and the VNP 20 may be associated with another brand of service provider.

The system 10 is predominately described with respect to the device 12 being configured to access high-speed data Internet services through the VNP 20. The access network controller 16 (Internet gateway controller, network address translator (NAT), etc.) may be configured to facilitate the Internet access with cooperation of a Wi-Fi access point 22, a cable modem 24 and a cable modem termination station 26. While the system 10 is described with respect to facilitating Internet access, the present invention fully contemplates and envisions the device/user 12 traveling from the HSP 18 to the VNP 20 to access any type of service and not just high-speed data Internet services. These other types of services, for example, may include accessing telephone services, cellular services, VoIP services, television services, data downloads, and virtually any type of other service where electronic signals are exchanged and where there may be a need to allow the device/user 12 to travel or otherwise roam from its HSP 18 to VNP 20 while maintaining or gaining access to the electronic services. The device 12 for illustrative purposes as shown to be a mobile computer, but it may be any other type of device, such as but not limited to a phone, tablet, set top box (STB), media terminal adapter (MTA), personal digital assistant (PDA), etc.

One non-limiting aspect of the present invention contemplates facilitating brand awareness while the user travels from the HSP 18 to the VNP 20. This may include displaying a logo of the HSP 18 to reinforce association with its services, to provide targeted advertising, and to provide other messages or indicia to their subscriber, which are collectively referred to herein as a watermark. The HSP 18 may include a home brand content device 30 configured to generate or otherwise determine the watermark desired for brand awareness. The home brand content device 30 may render the watermark for use with the device 12 while connected to the HSP 18 and for transmission to a similar visited brand content device 32 of the VNP 20. The home brand content device 30 may generate a plurality of watermark attributes instead of or in addition to the actual watermark, which may be used by the visited brand content device 32 to generate a corresponding watermark. Optionally, a third party content provider 36 may be in communication with one or both of the home and visited brand content devices 30, 32 to facilitate adding third-party content to the watermark. Third-party content may be content provided by a third-party according to personal information of the user, such as to facilitate targeted advertising or message delivery, e.g., e-mail, network updates, news feeds, etc.

The watermark and/or the watermark attributes may be communicated to the visited brand device 32 with a universal resource indicator (URI) or other suitable message. The URI may be sufficient for use with corresponding Remote Authentication Dial In User Service (RADIUS) Authentication, Authorization, and Accounting (AAA) proxy servers 38, 40 of the HSP 18 and the VNP 20. The AAA proxy servers 38, 40 may be configured to exchange the URI or other data associated with the watermark and/or watermark attributes in a manner sufficient to facilitate rendering and interfacing of the desired watermark while the user accesses services through the VNP 20. The URI may be communicated between the AAA proxy servers 38, 40 in a manner that apprises the visited brand content device 32 of the desired watermark while optionally preventing the visited brand content device 32 or other entity associated with the VNP 20 from being exposed to or otherwise discovering the personal information relied upon by the home brand content device 30 to generate the URI. The use of AAA proxy servers 38, 40 is shown for exemplary purposes as the present invention fully contemplates use of other communication mediums and standards between the VNP 20 and HSP 18.

The system 10 is particularly concerned with facilitating communication between the VNP 20 and the HSP 18 in order to transmit information required to provide branding awareness in a manner that preserves confidentiality and other security beliefs of the user while connected to the VNP 20. In order to protect personal information of the user, one non-limiting aspect the present invention contemplates facilitating the watermarking without exposing personal information or other confidential information of the user to the VNP 20. The ability to maintain confidentiality over some of the user personal information may be beneficial to maintaining security over personal information collected by or disclose to the HSP 18, such as contractual information collected when the user subscribes to the HSP 18, information collected from user consumption of HSP services, or other information which may be particularly known to the HSP 18 but not publicly known to the VNP 20 or other entities outside of the HSP 18. This type of personal information may include the user's name, username and password associated with access to HSP services, billing address, age, gender, viewing habits, viewing preferences, watermark display preferences (e.g., level of transparency, size, location within browser window), advertising preferences, etc.

The home brand content device 30 and the visited brand content device 32 are shown to be stand-alone items operating cooperation with other devices of the respective HSP 18 and the VNP 20. Optionally, one non-limiting aspect of the present invention contemplates a watermark insertion device (not shown) having a plurality of application program interfaces (API) or other interfaces sufficient to facilitate the communication of signals and to execute operations necessary to facilitate the watermarking process contemplated herein. This may include such a device having one or more of the following: a device interface configured to exchange signals with a user device desiring to download content from the Internet; an Internet interface configured to exchange signals with the Internet to facilitate downloading content to the device 12; a home network interface configured to exchange signals with the home brand device 30; a visitor network interface configured to exchange signals with the visitor brand device 32; and a watermark generator configured to insert a watermark within content downloaded from the Internet to the user device.

Figure 2:
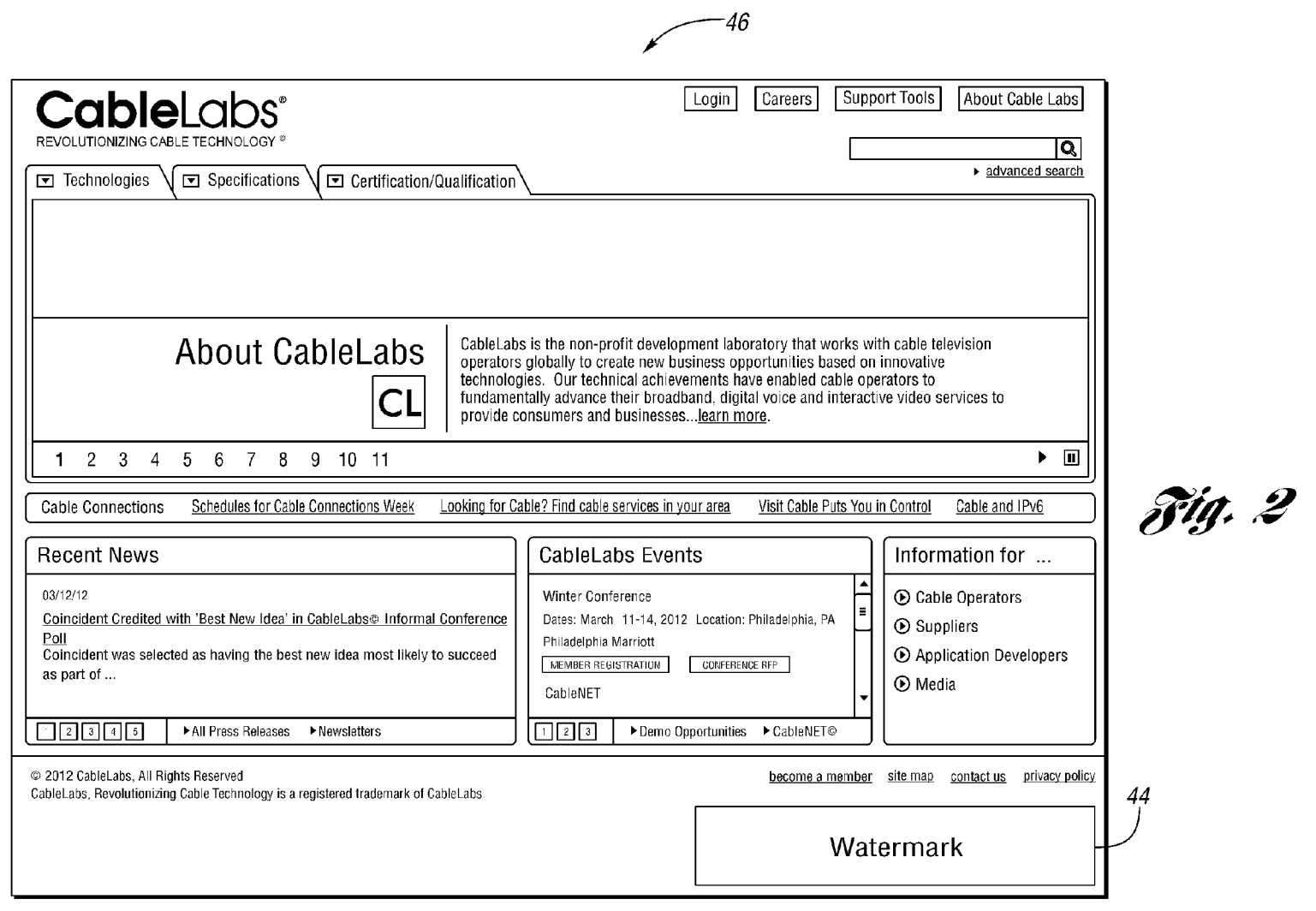

FIG. 2 illustrates a watermark 44 as contemplated by one non-limiting aspect of the present invention. The watermark 44 is shown to be embedded or otherwise added to a display 46 provided through a web browser operating on the mobile device 12. The mobile device 12 may include a client application embodied in a computer-readable medium having stored thereon a plurality of instructions including instructions which, when executed by a processor, cause the processor to facilitate the operations contemplated by the present invention. The watermark 44 may be added to data or other information collected by the web browser to display the illustrated webpage, such as by adding the watermark 44 to Hypertext Transfer Protocol (HTTP) responses used to carry the webpage data from its hosting server to the device 12. The visited brand content device 32 may be configured to intercept the corresponding HTTP request and to add the watermark 44 when the related HTTP responses received. In this manner the visited brand content device 32, or other VNP device (e.g., AAA proxy 40, access network controller 16, CMTS 26, etc.) may snoop or otherwise monitor traffic to identify signaling where it may be appropriate to insert the watermark 44. In the event multiple devices are visiting the VNP 20 and different watermarks 44 are desired, the visited brand content device 32 may track or otherwise identify signaling associated with each device to ensure the appropriate watermark 44 is added.

The illustrated watermark 44 is shown to be positioned at a lower right-hand corner of the browser display 46. The positioning, transparency, size, and other attributes of the watermark 44 may be specified by the user and/or the home brand content device 30. Optionally, the VNP 20 may coordinate or facilitate selecting one or more of the attributes of the watermark 44. As noted, one non-limiting aspect of the present invention contemplates personalizing the watermark 44 to the particular user without unduly or overly apprising the visited brand content device 32 or other element of the VNP 20 with the user's personal information. This may be accomplished by requiring the home brand content device 30 to generate the watermark 44 or otherwise specify the attributes of the watermark 44 so that the visited brand content device 32 need not assess the personal information of the user in order to generate and/or display the watermark 44. This may be accomplished by the home brand content device 30 processing the personal information of the user and providing the URI to the visited brand content device 32 or AAA proxy 40 along with instructions for executing other operations necessary to request delivery or placement of logos or graphics and/or to process logos or graphics included within the URI data associated with the URI message.

FIG. 3 illustrates a sequencing diagram 50 of a method for watermarking as contemplated by one non-limiting aspect of the present invention. The method is predominately described with respect to facilitating watermarking Internet content 14 or other content where data streaming or download is required and where an opportunity exists to embed or otherwise insert the watermark at the source of the content, e.g., web server, or at some point downstream thereof, e.g., at the mobile device 12, visited brand content device 32, access network controller 16, etc. The present invention fully contemplates facilitating watermarking with other Internet and non-Internet services, including television services, cellular services, and even audio only services where the watermark may be provided audibly instead of visually. The contemplated watermark 44 is predominately described as being used to identify the user's HSP 18 and not the authenticity of the content or the source of the content; however, the present invention fully contemplates using the watermark 44 to identify or authenticate the source/content, such as by providing the watermark 44 after verifying the content. The sequence diagram 50 is illustrated with respect to the use of RADIUS for exemplary non-limiting purposes as other protocols and messaging standards are contemplated.

Block 52 relates to the device 12 completing an authentication or association process sufficient to gain access to the VPN 20. The association process 52 may optionally be performed in a zero sign-on manner such that the device/user 12 is able to connect to the VPN 20 and gain access to its services without the user having to manually input username and password or other personally identifying information. Optionally, the association 52 may be based on certificates or other trust credentials provided to the device 12 by the HSP 18 that are understood by the VPN 20 and sufficient to authenticate access to VPN services. The certificates or other data exposed to the VPN 20 at the time of association may contain generic or non-user specific personal information, such as an assertion from the HSP 18, and identify of the HSP 18, and a non-personal identifier of the device that can be used to track its signaling over the VPN 20, such as but not limited to a media access control (MAC) address, Internet protocol (IP) address, etc. Various authentication related requests and response messages 54 may be exchanged between the device 12 and an authentication agent or other device of the VPN 20. These messages 54 may identify whether a relationship or other requirement exists between the VPN 20 and HSP 18 to support watermark-based branding.

In the event watermark-based branding is determined, an access request message 56 may be communicated from the VPN 20 to the HSP 18 to identify the connection of the device 12 and the need or desire for use of a watermark 44. Since the VPN 20 lacks sufficient personal information of the user, a secure tunnel 58 may be established between the device 12 and the HSP 18 to facilitate exchanging messages sufficient to personal identify the user and the appropriate watermark 44. The tunnel 58 may be established with reliance on VPN services and devices but in a manner that prevents the VPN 20 from snooping or otherwise being exposed to personal information exchanged between the device and HSP 18. The use of the tunnel 58 or other secure medium allows the present invention to facilitate personal identification of the user without the user having to be personally identified to the VPN 20. The home brand content device 30 may rely on the information exchanged through the tunnel to personalize the watermark 44 to the user. As described below in more detail, the home brand content device 30 may process the personal information independently of the VPN 20 and then provide the URI/watermark to the VPN 20 for insertion such that all processing and determining of the watermark 44 occurs outside the knowledge of the VPN 20 within a secure environment of the HSP 18.

The device 12 and HSP 18 may rely on the tunnel 58 to facilitate exchanging end-to-end authentication messages 60. The authentication messages 60 may be used to transmit personal information between the device 12 and HSP 18. The HSP 18 may use this information to collect all or a portion of the personal information relied upon to generate the watermark 44, e.g., a personal identifier provided by the device 12 may be used to look-up watermark attributes for the corresponding user within a database or other logical feature of the HSP 18. In addition to exchanging watermark related messaging and information, the end-to-end authentication messages 60 may also be used to facilitate authentication of the device 12, such as to authorize or verify a subscription or other relational agreement between the VNP 20 and HSP 18 that entitles the device 12 to access services through the VNP 20 as a guest or visitor. These messages 60 may be used in addition to the association process 52 to authenticate the device 12. In this event, the association process 52 may be used to temporarily grant access to the VNP 20 in order to facilitate establishment of the tunnel 58 such that complete or additional access to the VNP 20 is subsequently granted upon authorization from the HSP 18.

Once the HSP 18 generates or determines the attributes for generating the watermark 44 or determines information needed to log the device 12 into the VNP 20, an access accept message 64 may be communicated between the corresponding AAA proxies 38, 40 of the HSP 18 and VNP 20 (or other devices in the event RADIUS is not used). The access accept message 64 may include an attribute value pair (AVP) or other vehicle for communicating a URI pointing to a file containing the watermark 44, watermark rendering criteria, subscriber specific opt in or opt out preference to the watermark features, content provider exclusion request status to watermarking features and other information (e.g., access related messages or watermark attributes in the event a generator of the VNP is to render the watermark). The access accept message 64 is shown to be transmitted outside of the tunnel 58 and directly between the VNP 20 and the HSP 18. Optionally, the access accept message 64 may signify an opportunity to tear down the tunnel 58 and cease further exchange of end-to-end authentication messages 64 between the device 12 and HSP 18. The VNP 20 may now be tasked with supporting the device's continued access to services and any further changes or updates to the watermark 44, i.e., the watermark attributes may specify changing or updating the watermark 44 according to activities of the device 12 that the VPN 20 is responsible for monitoring and for triggering a corresponding change to the watermark 44.

Block 66 relates the VNP 20 and the device 12 finishing any further authentication and verification needed to complete access to the VNP services. This may include exchange of an authentication success message 68 and establishment of encryption between the VNP AP 22 and the device 12. The VNP 20 may transmit an accounting start message 70 to indicate completion of the sign-on process. While not illustrated, multiple accounting start messages 70 may be communicated over time to update the HSP 18 with activities of the device 12 in order for the HSP 18 to keep an accurate accounting of the device's activities, including activities which resulted the VNP 20 changing or otherwise updating the watermark 44. An accounting start message 70 may optionally be communicated to the HSP 18 each time activities arises for which the VNP 20 is to insert or otherwise interface a watermark 44 with the user. FIG. 3 illustrates an exemplary watermarking opportunity 72 with respect to web browsing activities of the device 12 for which the watermark 44 may be overlaid within browser displayed web pages. A corresponding access start message 70 may be communicated upon the VNP interception an HTTP request 74 from the device to access a certain web page over the Internet or other network of the VNP 20.

The HTTP request 74 may be communicated through the VNP 20 to the desired website. The website may respond with an HTTP response 76 to establish a connection or other suitable mechanism for communicating the corresponding content to the device 12 for display. The HTTP response 76 may be intercepted or snooped by the visited brand content device 32 or other sufficient device of the VNP 20 in order to trigger a corresponding opportunity to embed or otherwise add the desired watermark 44 to the displayed webpage 46. Thereafter, the watermark 44 may remain displayed throughout the web browsing session and/or upon creation of additional web browsing sessions such that the watermark 44 is automatically displayed without having to re-intercept either one of the HTTP request 74 or HTTP response 76. Optionally, in the event of a certain triggering event or other action by the VNP 20 or HSP 18, a change of authorization message 80 may be communicated from the HSP 18 to the VNP 20. The change of authorization message 80 may be used to update or change the watermark information/attributes, which may include changing the display watermark 44 or other features associated with the watermark 44, such as its position or appearance. A similar process 82 of intercepting subsequent HTTP request 84 and embedding the updated watermark in the corresponding HTTP response 86 may be undertaken to display the new watermark.

While the foregoing describes a roaming operation where the device travels from HSP to a single VNP, the present invention fully contemplates the device traveling to additional VNPs. Travel between additional VNP may occur rapidly such that the HSP may be required to provide the URI or complete the other operations associated with generating URI as the device travels at the rapid rate of speed between various VNPs. The roaming of the device may include traveling between VNPs having different relational agreements with the HSP such that the watermark displayed at one VNP may be different from the watermark displayed at a second VNP. Optionally, the watermark displayed at each VNP may be different even though the device is accessing the same content, e.g., while the devices accessing the same webpage, movie streaming, data download, etc. The differing watermarks may result from a different relational agreement between the VNPs and the HSP such that the display watermark is driven by the relation between the VNP and HSP and not necessarily according to the access content.

As supported above, one non-limiting aspect of the present invention contemplates a method for a Home Service Provider (HSP) to transfer watermark logo information to a Visited Network Provider (VNP) using AAA protocols (e.g. RADIUS), which may beneficial to operators looking to deploy WiFi roaming services, particularly those desiring to provide brand awareness to their subscribers while they are roaming on partner networks. The brand awareness may be through various kinds of displays (watermarks embedded in the browser, browser plugins, redirection). This invention provides a method and apparatus for the home network to provide or indicate to the visited network: home network brand awareness content; the location of the content on subscriber screen (e.g. bottom left corner, pixel location); the format (e.g. HTML5, Flash) of the home brand awareness content and/or the format of the content selected based on the device being used by the subscriber, which home network comes to know from the visited network operator; and/or additional transport mechanisms or protocols needed to support multi-media home brand awareness content.

One non-limiting aspect of the present invention contemplates application of brand awareness content to the user device through browser, icon placement on tool bars or device user interfaces (UIs), or other native applications. This may include adding brand awareness content into content streams to the user (including visual image over web content, scrolling text lines, icon placement, audio stream insertion); indicating and instructing how the brand awareness content is personalized to a specific subscribe (example embodiment includes the subscribers name in the displayed brand content); sharing Wi-Fi roaming service coverage map in and around the subscriber current location; updating the brand awareness content mid-session. One non-limiting aspect of the present invention contemplates providing a method and apparatus for the visited network to provide or indicate to the home network: subscriber device type and/or overall load on the Wi-Fi Access point currently being used by the subscriber. The home network may use this information to decide the type and extend of home network logo to be displayed on the subscriber device.

The brand awareness information may be communicated from the home network to the visited network during network admission to the visited network as authorized by the home network. The brand awareness information may also be communicated mid-session or during any network provided change in service for the subscriber while on the visited network. As part of this proposal, a preferred embodiment of the invention is to use communication network AAA mechanisms to help communicate brand awareness information. One example is the use of AAA protocols (e.g. RADIUS and diameter), which will allow the home network to transfer the watermark information (e.g. URL to the watermark, the watermark itself, collection of information that can be used to build and place the water) to the visited network. Visited network can in turn use this information to display the watermarks on the browser.

The AAA attributes or other sufficient watermark attributes may include: an attribute to provide a URL to the watermark; an attribute to provide the watermark itself; an attribute to provide the level of transparency associated with the watermark; an attribute to provide the size of the watermark; an attribute to provide the location of the watermark on the subscriber screen (e.g. browser); an attribute to provide the hyperlink associated with the watermark; an attribute to provide personalized information about the subscriber, which optionally may be displayed as part of the logo; an attribute to provide a list of methods for VNP to use to deliver the brand awareness information to subscriber; an attribute to provide the device type subscriber is using to accept Wi-Fi roaming services, which may be shared by the VNP, an attribute to indicate subscriber opt in or opt our status to watermark features, an attribute to indicate content provider exclusion status of watermark features; and/or an attribute to share the map of Wi-Fi footprint around subscriber current location One use case where an Internet Service Provider might be interested in inserting watermarks into the content is Wi-Fi roaming. Wi-Fi roaming allows a subscriber of ISP#1 to roam into ISP#2 territory and access the Internet using ISP#2 Wi-Fi hotspots. The subscriber is allowed this access by providing his/her ISP#1 credentials to the ISP#2, which ISP#2 verifies with the ISP#1 before granting the access. While this Wi-Fi roaming service is of value to subscribers, the operator (ISP#1) may want to display ISP#1 brand on the subscriber screen to indicate that the service is being provider by the ISP#1. The present invention allows ISP#1 (Home Service Provider (HSP)) to share the watermark information with ISP#2 (Visited Network Provider (VNP)) in real time at the time of subscriber authentication and in the middle of the session. This process may be used to provide a means where the client receives branding information, not necessarily based on the client location, but based on the relationship between roaming partner networks. One partner may agree to send branding information of another network to the subscriber of that other partner network. For example, if a stationary subscriber switches between Wi-Fi APs or a Wi-Fi AP and a cellular IP service, the same home network brand appears to the subscriber regardless of whether or not each AP and the cellular network are provided by separate service providers. The invention can be applied regardless of the client location. Network access and relationships between operators may be used to drive the delivery of branding.

One non-limiting aspect of the present invention relates to a method of watermarking Internet content when a device roams between two or more networks, such as where the networks are associated with corresponding individual Internet service providers (ISPs). The method may include identifying a home ISP as the one of the ISPs corresponding with the home network which the network; processing watermark attributes for the home ISP where the attributes are collected from the home network as part of network admission signaling or pre-provisioned in the visited network on behalf of the home network; and generating a rendering according to the watermark attributes identified and associating the rendering with content transported through the connected to one of the visitor networks, the associating causing the rendering to be interfaced with a user of the device while accessing the transported content. The application of the watermark within the content transported through the connected to one of the visitor networks may be optionally dependent upon an opt in or opt out selection status for the corresponding subscriber and/or content provider (e.g., website to which Internet data is being downloaded).

The opt in or opt out status may be used to respectively indicate use of the watermark or prohibition of the watermark depending on the subscribers preferences and/or the preferences of the content provider associated with the data being transported through the connected to one of the visited networks. The ability of the present invention to selectively apply the watermark according to subscriber or content provider preferences may be beneficial and facilitating user-specific application of the watermark. The preference capabilities may optionally allow a home network to share subscriber preferences and profile with the visited network. The preferences and profile could include information such as: age, sex, favorite search engine, favorite news service provider. The visited network can use this information to selectively apply the watermark, such as to provide advertisement on its content properties. The preference capabilities may optionally allow a home network to indicate the traffic routing preferences to the visited network. This may be helpful for the cases where MNO would like some or all subscriber traffic to be tunneled to the 3GPP EPC in order to provide services such as IMS and texting. The preference capabilities may optionally allow encryption methods and keys that visited network should used to secure the traffic and tunnel to the home network. The preference capabilities may optionally allow me home network to share the list of content providers that have objected to the insertion of watermark in their content (this was part of original disclosure but does not seem to be part of the write up). The preference capabilities may optionally allow a home network to share broadcast video service profile of the subscriber to visited network, which visited network can utilize and offer access to same video services to the subscriber on their network.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of watermarking Internet content when a device roams between at least first, second, and third networks, the first, second, and third networks being associated with corresponding first, second, and third Internet service providers (ISPs), the first, second, and third ISPs desiring display of corresponding first, second, and third watermarks, the first, second, and third watermarks each pictorially representing the corresponding first, second, and third ISPs with individually distinguishable images, one of the first, second, and third networks being considered as a home network of the device and the remaining ones of the first, second, and third networks being considered as visitor networks, the method comprising:
   identifying whether the device is connected to the home network or one of the visitor networks; and
   in the event the device is connected to one of the visitor networks:
   i) identifying the home network of the device;
   ii) identifying a home ISP as the one of the first, second, and third ISPs corresponding with the home network;
   iii) processing a universal resource indicator (URI) to identify watermark attributes for the home ISP;
   iv) generating a rendering according to the watermark attributes identified with the URI;
   v) associating the rendering with content transported through the connected to one of the visitor networks, the associating causing the rendering to be interfaced with a user of the device while accessing the transported content;
   vi) facilitating creation of a tunnel between the client and the home ISP through which confidential information is transmitted without being exposed to the connected to one of the visitor networks, the confidential information being relied upon to select at least one or more of the watermark attributes; and
   the home ISP selecting the at least one or more of the watermark attributes based on the confidential information, and based thereon, transmitting the URI to the connected to one of the visitor networks for processing and identification of the watermark attributes.

2. The method of claim 1 further comprising identifying the home network without identifying the user of the device.

3. The method of claim 1 further comprising identifying the home network without identifying a password of the user used to authenticate the device with the home network.

4. The method claim 1 further comprising identifying the home network without requiring the user to input or disclose a username and password to the connected to one of the visitor networks at the time of authenticating the device to access the Internet.

5. The method of claim 1 further comprising receiving the URI in response to issuance of a URI request from the connected to visitor network to the home ISP.

6. The method of claim 1 further comprising embedding the rendering within data transmitted from a Web server connected to the Internet, the data transmitted from the Web server comprising at least part of the transported content.

7. The method of claim 6 further comprising embedding the rendering after the data has been transmitted from the Web server and prior to receipt by the device.

8. The method of claim 1 further comprising the device issuing a Hypertext Transfer Protocol (HTTP) request to connect to and receive data from a Web server, wherein the method further comprises embedding the rendering within an HTTP response generated by the Web server to the HTTP request.

9. A method of watermarking internet content when an device roams between two or more networks, the networks being associated with corresponding individual Internet service providers (ISPs), one of the two or more networks being considered a home network and reaming ones of the two or more networks being considered as visitor networks, when the device is connected to one of the visitor networks method comprising in the event the device is connected to one of the visitor networks: Identifying the home network of the device; identifying a home ISP as the one of the ISPs corresponding with the home network which the network; processing determining watermark attributes from a universal resource indicator (URI) issued from the home network, the home network determining the watermark attributes as function of confidential information securely transmitted through a tunnel form the device over the connected to one of the visitor networks to the home network without being exposed to the connected to one of the visitor networks; generating a rendering according to the watermark attributes and associating the rendering with content transported through the connected to one of the visitor networks, the associating causing the rendering to be interfaced with a user of the device while accessing the transport content.

10. The method of claim 9 further comprising:
applying the watermark, or not applying the watermark, to the content transported through the connected to one of the visitor networks to the subscriber based upon the subscriber's watermark feature opt in or opt out selection status: this status being received by the visited network from the home network as part of the network admission signaling for that home network subscriber; and
applying the watermark, or not applying the watermark, to the content transported through the connected to one of the visitor networks to the subscriber based upon third party content provider watermark exclusion status: this status being received by the visited network from the home network as part of the network admission signaling for a home network subscriber.

11. The method of claim 9 further comprising determining the attributes when the confidential information is securely transmitted from the device to the home network within the tunnel as constructed at least partially over the one of the visitor networks.

12. A watermark insertion device operable to facilitate watermarking Internet content when a device roams between at least first, second, and third networks, the first, second, and third networks being associated with corresponding first, second, and third service providers (SPs), the first, second, and third SPs desiring display of corresponding first, second, and third watermarks, the first, second, and third watermarks each pictorially representing the corresponding first, second, and third SPs with individually distinguishable images, one of the first, second, and third networks being considered as a home network of the device and the remaining ones of the first, second, and third networks being considered as visitor networks, the device comprising:
at least one interface for receiving signals sufficient for identifying whether the device is connected to the home network or one of the visitor networks; and
a watermark generator operable with the at least one interface, for in the event the device is connected to one of the visitor networks:
i) identifying the home network of the device;
ii) identifying a home SP as the one of the first, second, and third SPs corresponding with the home network;
iii) processing a universal resource indicator (URI) to identify watermark attributes for the home SP;
iv) generating a rendering according to the watermark attributes identified with the URI; and
v) associating the rendering with content transported through the connected to one of the visitor networks, the associating causing the rendering to be interfaced with a user of the device while accessing the transported content;
wherein the watermark generator is operable with the at least one interface to facilitate creating a tunnel between the client and the home SP through which confidential information is transmitted without being exposed to the connected to one of the visitor networks, the confidential information being relied upon to select at least one or more of the watermark attributes; and
wherein one of the at least one interface is operable to receive the URI from a home branding agent of the home SP, the URI being transmitted from the home branding agent in response to issuance of a URI request from the connected to visitor network to the home SP, the home branding agent generating the watermark attributes as a function of the confidential information transmitted through the tunnel without being exposed to the connected to one of the visitor networks.

13. The watermark insertion device of claim 12 wherein the home SP selects the at least one or more of the watermark attributes based on the confidential information.

14. The watermark insertion device of claim 12 wherein the watermark generator identifies the home network without identifying the user of the device or without identifying a password of the user used to authenticate the device with the home network.

15. The watermark insertion device claim 12 wherein the watermark generator identifies the home network without requiring the user to input or disclose a username and password to the connected to one of the visitor networks at the time of authenticating the device to access the Internet.

16. The watermark insertion device of claim 12 wherein the watermark generator is operable to facilitate embedding the rendering within data transmitted from a Web server connected to the Internet, the data transmitted from the Web server comprising at least part of the transported content.

17. The watermark insertion device of claim 16 wherein the watermark generator is operable to facilitate embedding the rendering after the data has been transmitted from the Web server and prior to receipt by the device.

18. The watermark insertion device of claim 12 wherein the device issues a Hypertext Transfer Protocol (HTTP) request to connect to and receive data from a Web server, wherein the watermark generator is operable to facilitate embedding the rendering within an HTTP response generated by the Web server to the HTTP request.

19. A non-transitory computer-readable medium having non-transitory instructions, operable with a watermark insertion device, sufficient to facilitate watermarking Internet content when a device roams between two or more networks, the networks being associated with corresponding individual service providers (SPs), one of two or more networks being considered a home network and the remaining ones of the two or more networks being considered as visitor networks, the non-transitory computer-readable medium comprising non-transitory instructions sufficient for:
identifying whether the device is connected to the home network or one of the visitor networks; and
in the event the device is connected to one of the visitor networks:
i) identifying the home network of the device;
ii) identifying a home SP as the one of the SPs corresponding with the home network which the network;

iii) issuing an access request message to the home SP, the access request prompting the home SP to establish a tunnel with the device through which confidential information is exchanged, the home SP relying at least partially on the confidential information exchange through the tunnel to generate watermark attributes, the watermark attributes sufficient to facilitate displaying a pictorial or textual watermark on the device and being identified with an associated universal resource indicator (URI);

iv) processing the URI to determine the watermark attributes for the home SP; and v) facilitating generation of a rendering according to the watermark attributes and associating the rendering with content transported through the connected to one of the visitor networks, the associating causing the rendering to be interfaced with a user of the device while accessing the transported content.

\* \* \* \* \*